Figure 1:
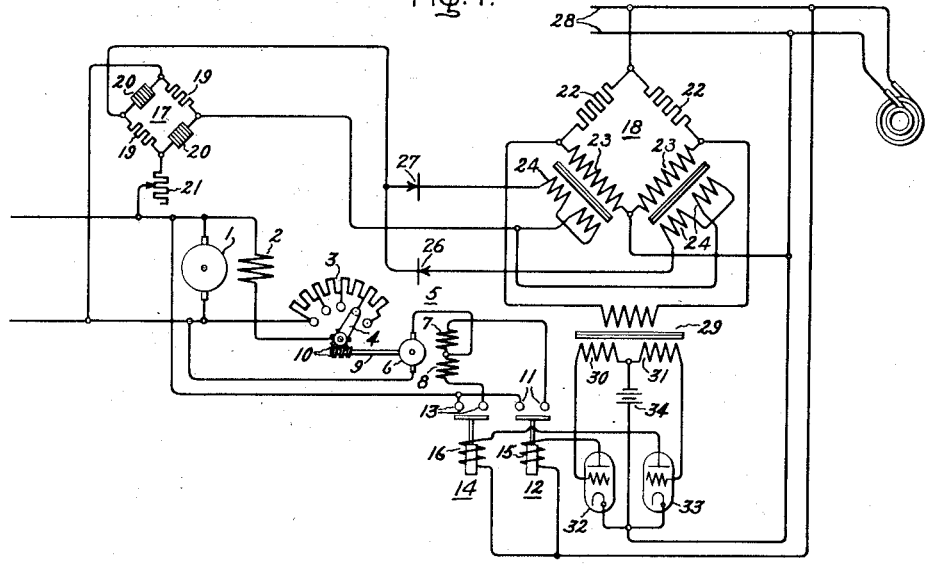

Feb. 20, 1934.  A. S. FITZ GERALD  1,948,372
REGULATING SYSTEM
Original Filed Sept. 2, 1931   2 Sheets-Sheet 1

Inventor:
Alan S. FitzGerald,
by Charles A. Mullen
His Attorney.

Patented Feb. 20, 1934

1,948,372

UNITED STATES PATENT OFFICE 1,948,372

REGULATING SYSTEM

Alan S. Fitz Gerald, Wynnewood, Pa., assignor to General Electric Company, a corporation of New York Application September 2, 1931, Serial No. 560,799
Renewed July 11, 1933

13 Claims. (Cl. 171—119)

My invention relates to regulating systems and more particularly to regulating systems utilizing electric discharge devices for controlling an electrical characteristic of a dynamo-electric machine or circuit.

An automatic regulating system usually employs a control element responsive to the condition to be regulated. In electromechanical regulators some form of relay with moving parts is usually employed whereas in regulators utilizing electric discharge devices it is desirable to have some control element which has neither contacts nor moving parts. A form of control element for the latter type which has been proposed and used employs a differential or balance circuit made up of impedances having linear and non-linear volt-ampere characteristics respectively. The various arrangements which have been proposed are of considerable value for specific purposes but they are not universally suitable in the whole field of automatic regulation employing electric discharge devices. Some of the arrangements utilizing a saturating reactor in a bridge circuit have been found to be very satisfactory for alternating current service exclusively, whereas balance circuits employing inherently variable resistance elements in the respective arms of a bridge have been found to operate with both alternating and direct current circuits but with much less sensitivity on direct current circuits than on alternating current circuits. By the term "sensitivity" is meant the magnitude of the difference voltage from the bridge generated for any given deviation from the given value of the regulated condition. When a bridge circuit of variable impedance elements is used in an alternating current circuit the difference voltage can be stepped up by means of a transformer which may have a ratio of 10:1 or more and a very small change in the balance circuit may be made to operate the electric discharge tubes of a regulating system. However, when the balance circuit is operated from a direct current circuit in the manner heretofore employed, it is seldom possible to obtain very sensitive control of vacuum tubes or vapor discharge devices unless the direct current supply voltage is abnormally high. The reason for this is that while electric discharge tubes of the types commercially available at the present time may be controlled with an extremely small amount of power they cannot be controlled with any great precision by means of relatively low voltages. The exact grid voltage at which a vapor discharge device permits plate current to pass is not definite to within one or two volts and may vary with temperature and other factors such as change in characteristics of the tube with time.

It is an object of my invention to provide a new and improved circuit for detecting by means of electric discharge devices of either the high vacuum type or vapor discharge type relatively low direct current differences of potential with a high order of accuracy.

Another object of my invention is to provide a new and improved regulating system employing electric discharge devices equally sensitive and applicable for use in connection with direct or alternating current dynamo-electric machines or circuits.

In accordance with my invention I employ two bridge circuits one of which may be referred to as the A. C. bridge and the other as the D. C. bridge. The A. C. bridge is energized from a source of alternating current energy the voltage magnitude of which is of no importance and does not in any way affect the exact direct current voltage which is regulated. The electrical condition to be regulated is impressed upon the D. C. bridge in the form of a direct current voltage and the condition to be maintained is determined by this bridge alone. The output of the D. C. bridge is applied to the A. C. bridge and the output voltage thereof is used to control the control electrodes of electric discharge devices. This arrangement is suitable for general application in any circuit employing electric discharge devices where it is required to detect low voltage direct currents, but it is especially suitable for regulating systems for dynamo-electric machines employing electric discharge devices and will be described in this connection.

My invention will be better understood from the following description taken in connection with the accompanying drawings and its scope will be pointed out in the appended claims.

Figure 2:
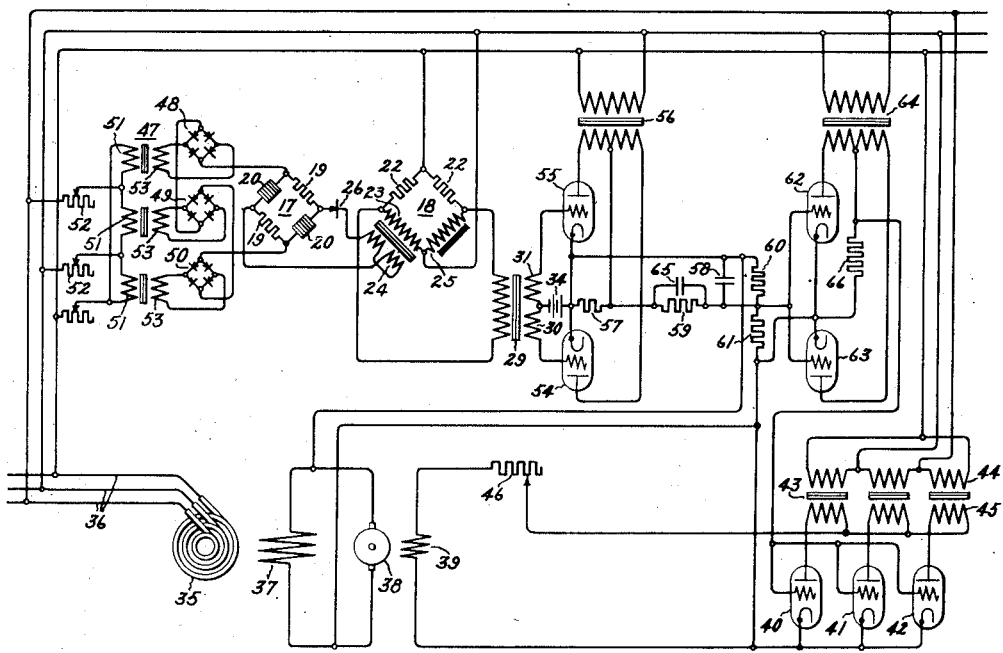
Figure 3:
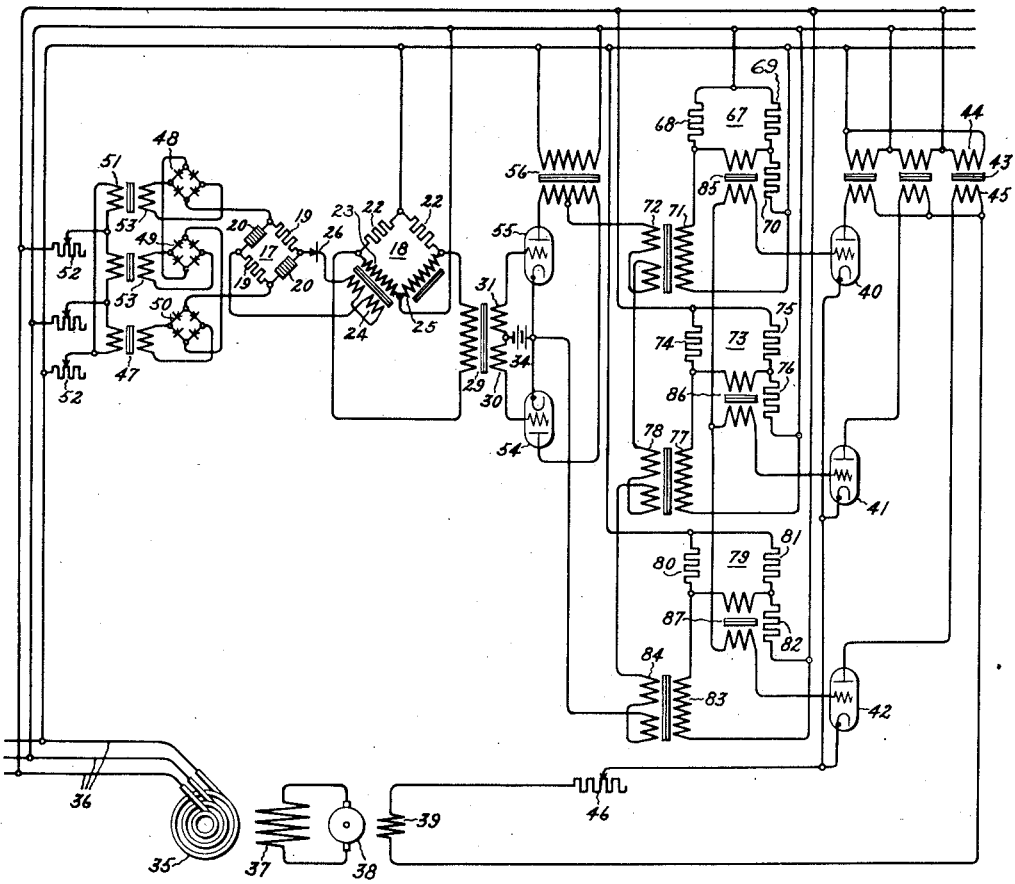

In the drawings Fig. 1 is a diagrammatic representation of an embodiment of my invention in a regulating system for direct current circuits and Figs. 2 and 3 are diagrammatic representations of embodiments of my invention adapted for use in regulating systems for alternating current circuits.

Referring now to Fig. 1 of the drawings, I have illustrated an embodiment of my invention in a simple regulating system for a direct current dynamo-electric machine working on what may be described as the "position" principle. This principle happens to be one which is readily described and explained. The position type of voltage regulator is a device which is inactive over a small range of voltage variation but which produces a corrective action when the voltage variation exceeds this small range. Thus the regulated voltage is always held within certain narrow limits except when the regulator is operating to restore the voltage within these limits. In the drawings, 1 is a direct current generator provided with a shunt connected field winding 2. An automatically operated rheostat comprising a resistance 3 and a resistance controlling arm 4 is connected in circuit with field winding 2. The rheostat is provided with suitable actuating means for moving the arm 4 in either direction. As shown, the arm 4 is actuated by a reversible motor 5 having an armature 6 and field windings 7 and 8 and connected to the arm 4 through a shaft 9 and suitable gearing 10. One brush of the motor 5 is electrically connected directly to one side of the generator load circuit and the other brush is connected to the common terminal of the field windings 7 and 8. The free terminal of field winding 7 is connected through contacts 11 of a relay 12 to the other side of the generator load circuit and similarly the free terminal of field winding 8 is connected through contacts 13 of a relay 14 to the same side of the generator load circuit. The relays 12 and 14 are provided with operating coils 15 and 16, respectively, which are energized, in accordance with the operation of the voltage regulating element now to be described.

In accordance with my invention the voltage regulating element comprises two bridge circuits, a D. C. bridge 17 and an A. C. bridge 18. The bridge 17 comprises two opposite legs 19 of resistance elements having a linear volt-ampere characteristic and two other legs 20 of resistance elements having a non-linear volt-ampere characteristic such as tungsten filament lamps or as shown of a ceramic material consisting of silicon carbide and carbon or other conducting materials as described and claimed in United States Letters Patent No. 1,822,742, granted September 8, 1931, upon an application of Karl B. McEachron, and assigned to the assignee of the present application. The terminals of one diagonal of this bridge are connected to the terminals or load circuit of generator 1 and the terminals of the other diagonal are connected to control the A. C. bridge 18. At one certain voltage applied to the bridge 17 the variable resistances 20 will have such a value that the voltage drops in the adjacent legs 19 will be equal and the bridge will be balanced. At any other voltage applied to the bridge there will be a voltage generated by the bridge, positive if the line voltage is high and negative if the line voltage is low. An adjustable resistance 21 is connected in circuit with the input terminals of the bridge to provide an easy and simple means of changing the balance point so that the regulator will regulate for different line voltages.

The A. C. bridge comprises a balanced inductance bridge containing four impedances, two of which, or more, may be inductances. As illustrated two adjacent arms are indicated as resistances 22 and the other two adjacent arms are indicated as inductances 23. Each inductance is provided with a direct current saturating winding 24. The saturating windings 24 are connected to be energized from the output terminals of the bridge 17 through two rectifiers 26 and 27 which may conveniently be of the contact type, for example of the copper oxide type. These rectifiers are connected in reverse directions. The effect of this is that if the bridge 17 unbalances in one direction current will flow through one rectifier and into one saturating reactor, whereas if the bridge 17 unbalances in the opposite direction current will flow through the other rectifier and saturate the other reactor. The input terminals of bridge 18 are connected to any convenient source of alternating current indicated by the circuit 28. With this arrangement the bridge 18 will unbalance in exactly the same way as the bridge 17. In other words, it will indicate quite definitely whether the D. C. bridge voltage is correct, or is high or low. It is particularly to be noted that the D. C. balance circuit determines absolutely the balance point and none of the auxiliary connections have anything to do with the actual point at which the direct current difference voltage changes from positive to negative. Therefore all kinds of changes in the characteristics of these secondary components of the circuit will not affect the voltage which the regulator tends to hold.

The output of the alternating current bridge 18 is applied to a step-up transformer 29 with two secondary windings 30 and 31. The secondary windings control the control electrodes of electric discharge devices 32 and 33. The electric discharge devices are preferably electric valves of the vapor discharge type if comparatively large currents are to be controlled. Each valve is provided with an anode, a cathode and a grid in which the phase relation of the potential between the anode and grid controls the point in the cycle of anode potential at which the valve will start to conduct current. The control grids of the valves 32 and 33 are connected to the free terminals of transformer windings 30 and 31 respectively and to their common cathode circuit through the common connection of the transformer windings and a grid biasing battery 34. The anode circuit of valve 32 is connected in series with the operating coil 15 of relay 12 to the alternating current circuit 28. Similarly, the anode circuit of valve 33 is connected in series with the operating coil 16 of relay 14 to the alternating current circuit 28. The secondary windings 30 and 31 control the grids of the valves 32 and 33, being connected so that the grids are excited by a voltage of opposite polarity or 180° phase relation. The plate supply of the two valves is taken from the auxiliary alternating current supply 28 so that the plate voltages are in phase and the input to the alternating current bridge is also in phase with the plate voltage. With the proper bridge impedances the output of the bridge 18 is in phase or 180° out of phase with the auxiliary alternating supply voltage depending upon which reactor is saturated. If the unbalance voltage of bridge 18 is in phase with the valve plate voltage the grid of one valve will allow it to conduct while the second tube will be held off due to the opposite polarity of its grid excitation. Similarly, if the unbalance voltage of bridge 18 is out of phase with the auxiliary alternating supply the second valve is allowed to conduct while the first is held off due to its opposite grid phase.

The operation of the embodiment illustrated in Fig. 1 is as follows: Assume that generator 1 is in operation, that alternating circuit 28 is energized, and that the various movable parts are in the positions illustrated. For purposes of illustration it will be assumed that relay 12 when energized effects a decrease in the voltage of generator 1 and that relay 14 when energized effects an increase in the voltage of generator 1. For the instant it will be assumed that the voltage of generator 1 is at the value to be maintained constant. Under these conditions the difference voltage from bridge 17 will be zero or within predetermined narrow limits so that the degree of saturation of the windings 24 is such as to effect a balance of the bridge 18. Accordingly, the valves 32 and 33 will be held off and relays 12 and 14 will remain de-energized. Now assume that the generator voltage rises thereby furnishing a positive difference voltage to one of the saturating windings 24 of one of the reactors 23 of the bridge 18 so that valve 32 is rendered conducting. The relay 12 is energized and it will as assumed operate motor 5 in a direction to increase the resistance 3 and thereby decrease the voltage of generator 1. Similarly, if the voltage of generator 1 falls the bridge 17 will furnish a negative difference voltage which energizes the saturating winding 24 of the other reactor so that valve 33 is rendered conducting. The relay 14 is energized so as to operate motor 5 in the opposite direction and decrease the resistance 3 and thereby increase the voltage of generator 1.

In Fig. 2 of the drawings I have illustrated an embodiment of my invention adapted for use with an alternating current circuit. A dynamo-electric machine 35, shown as a synchronous three phase alternator, is connected to supply power to a power circuit 36. The alternator 35 is provided with a field winding 37 which is supplied from an exciter 38. The exciter 38 is provided with a field winding 39 which is connected to be energized through electric discharge devices 40, 41 and 42 from the alternating current power circuit 36. The electric discharge devices are each provided with an anode, a cathode and a grid and are preferably electric valves of the vapor discharge type in which the starting of the current through the valve may be controlled by the magnitude and phase of the grid potential. Transforming means 43 is provided for supplying current from circuit 36 through the valves to the field winding 39. This transforming means comprises a primary winding 44, and a secondary winding 45 connected in star. The anodes of the valves are connected respectively to the free terminals of the respective phase windings of the secondary windings 45. The neutral point of the star-connected secondary windings is connected to one side of the field winding 39 through an adjustable resistance 46, and the circuit through the field winding is completed to the cathodes of the valves.

The voltage determining and control circuit for the valves includes the bridge 17, the bridge 18, the transformer 29 connected in the output circuit of the bridge 18, as described in connection with Fig. 1. There is only one saturable reactor 23 provided the other arm of the bridge being a non-saturable reactor 25. In order to obtain regulation on all phases, a three phase rectifier is used to convert the three single phase voltages of the alternator into one direct current voltage which is a function of the voltages of all three phases. The input terminals of bridge 17 are connected to be energized from the alternator voltage by means of transformer 47 and rectifiers 48, 49 and 50. The transformer 47 is provided with primary windings 51 which are connected in delta and to the power circuit 36 through adjustable resistors 52 which are provided for adjusting the output voltage of bridge 17 so that the balance point may be adjusted for different line voltages. The transformer 47 is also provided with a plurality of single phase secondary windings 53. The various windings are connected respectively to the full wave rectifiers 48, 49 and 50. Full wave rectifiers are preferably used to eliminate as far as possible the ripple appearing in the output circuit of the rectifier group. These rectifiers may be of any suitable type but as shown are of the dry surface contact type, for example, copper oxide rectifiers of the type described and claimed in United States Letters Patent No. 1,640,335, granted August 23, 1927 upon an application of Lars O. Grondahl. The direct current output terminals of each rectifier unit are connected in series and the free terminals of rectifier units 48 and 50 are connected to opposite terminals of the bridge 17. The output terminals of bridge 17 are connected through rectifier 26 to the saturating winding 24 of reactor 23 in the bridge 18. The input terminals of the bridge 18 are energized from the circuit 36 or any alternating current voltage having the same phase relation as the alternator voltage and the output terminals are connected to energize the primary winding of the step-up transformer 29. The secondary windings 30 and 31 are connected to two electric discharge devices 54 and 55. The voltage determining circuit just described is similar to the arrangement illustrated in Fig. 1 and the similar elements have been assigned like numerals. It is to be noted, however, that this is a one way arrangement having only one rectifier 26 and only one saturating reactor. As a result the voltage determining circuit operates on one side of the balance point only between zero difference voltage and a positive value. If the difference voltage changes in polarity the control is cut off from the bridge 18 by the rectifier 26.

In this modification the electric discharge devices 54 and 55 are assumed to be of the high vacuum type rather than of the vapor discharge type and are each provided with an anode, a cathode, and a control electrode. The grids of the discharge devices 54 and 55 are connected to be energized from the difference voltage of the secondary windings of transformer 29 thereby controlling the anode current of these tubes in accordance with variations in the line voltage. The anode potential is obtained from the power circuit 36 through a transformer 56 having its primary winding connected to the power circuit 36 and the free ends of its secondary winding connected to the anodes of the respective discharge devices. It is to be noted that in this instance the anodes are connected to voltages 180° in phase, the grids likewise being respectively opposite in phase. Thus the relation between each grid voltage to its respective anode voltage is similar and the tubes give full wave rectified current. Due to amplification of the various parts of the circuit there is a large change in the anode current of the discharge devices 54 and 55 with a small change in line voltage. This change manifests itself as a change in voltage across a resistance 57 which is connected in series relation with the anode circuit of the discharge devices.

In order to prevent the regulator from overshooting, damping means are provided. The dampening is accomplished by charging a condenser 58 through a high resistance 59 by the voltage appearing across the resistance 57. In order to avoid hunting when the alternator is operating near or above the steady state limit a resistance 60 is connected across the damping condenser 58. In order to avoid hunting which is due primarily to the self induction of the alternator field it is necessary to compare the change in alternator voltage with some electrical quantity which is a definite and continuous function of the excitation required by the alternator at normal voltage for any load condition. The voltage of the exciter is such a quantity and is compared with the voltage appearing across the resistor 60. The time constant of the exciter is relatively small so that as the exciter voltage varies the difference in the two voltages is impressed across a resistor 61. The voltage appearing across resistor 61 is used to control an amplifier circuit comprising two electric discharge devices 62 and 63 each having an anode, a cathode and a grid. The anode potential supply is obtained from the power circuit 36 through a transformer 64. Except for very low loads the circuit thus far described may still have some tendency to hunt. In order to overcome this disadvantage and at the same time provide for prompt action under sudden changes in load a condenser 65 is placed across the resistance 59 in the damping circuit.

In order to effect control of the electric valves 40, 41, 42 and thereby the excitation of the alternator the anode current of the discharge devices 62 and 63 is caused to traverse a resistor 66. The cathode-grid circuit of the respective valves is connected to be energized in accordance with variations in potential drop across resistor 66. Control of the valves is obtained by controlling their grid potential that the valves pass current during an entire cycle or predetermined number of cycles and block current during a succeeding cycle or predetermined number of cycles. As illustrated in the drawings a unidirectional potential is obtained from the resistor 66 which supplies a potential in one direction to make the valves conducting and supplies a different potential in magnitude or polarity to prevent the current from starting through the valves.

The system of regulation and method of operation described in connection with Fig. 2, exclusive of the voltage determining circuit, is described and claimed in a copending joint application of George W. Garman and myself, Serial No. 498,416, filed November 6, 1930, and assigned to the assignee of the present application. The system of regulation employed in this embodiment is in accordance with the Tirrill principle and may be referred to as a matter of convenience as the "dynamic" type in contradistinction to the type illustrated in Fig. 1 which has been referred to as of the "position" type. Since the operation of the voltage determining circuit has been described in connection with the consideration of Fig. 1 and the operation of a dynamic type of regulator employing electric discharge devices shown in Fig. 2 has been described in connection with the aforementioned joint application it is believed only a brief description of the operating cycle will be necessary to understand the operation fully.

Briefly described, the operation of the embodiment illustrated in Fig. 2 is as follows: It will be assumed that the alternator 1 and its exciter 5 are in operation. At a voltage below the voltage to be maintained, or the balance voltage of bridge 17, the difference voltage is arranged to be of such magnitude and polarity as to saturate the winding 24 of the saturable reactor of bridge 18 and thereby cause the difference voltage of bridge 18 to be of such magnitude and phase as to increase the grid potential of the discharge devices 54 and 55 in a positive direction so that the anode current of these discharge devices is increased and a unidirectional voltage is obtained across the resistor 57. The voltage across the resistor 57 and consequently the voltage across resistor 60 under the low voltage condition is arranged to be greater than the exciter voltage which is in series opposition therewith. The polarity and magnitude of this resultant voltage is such as to bias the grids of the amplifier discharge devices 62 and 63 in a negative direction so as to make the anode current and consequently the voltage drop across resistor 66 a minimum. Under this condition the valves 40, 41 and 42 are arranged to be full on. As a result the field excitation is increased and the exciter voltage is increased to that value required for normal voltage. Just as soon as the exciter voltage attains the normal value the resultant voltage applied to the grids of the amplifier discharge devices decreases the negative bias or increases the grid potential in a positive direction so that the anode current of these devices increases. As a consequence the voltage drop across resistor 66 increases in a negative direction to shut the valves off. The result is that the exciter field current is interrupted intermittently by the grid control action of the valves just as the resistor is open circuited intermittently in the electro-magnetic type of regulator. The voltage across the resistor 60 remains practically constant for a given load condition and corresponds to the relatively fixed portion of the alternating current contact of the Tirrill-type regulator, whereas the voltage component from the exciter rises and falls about a mean value similar to the anti-hunting contact of the Tirrill-type regulator. This action causes the valves to open and close to maintain an average alternator excitation corresponding to the given load condition.

If the load on the alternator increases and the line voltage decreases from the value to be maintained there is a large change in the voltage across resistor 60. This action means that the exciter voltage does not have to vary far from the mean value before the valves are full on so that the valves are on for a greater period of time than they are off. The ratio of time-closed to time-opened of the valves is increased and the mean average excitation of the alternator is increased to maintain the alternator voltage for the new load condition. For a decrease of load and an increase in terminal voltage the exciter voltage must vary farther from the mean value before the valves are full on so that the ratio of time-closed to time-opened is decreased and the mean average excitation of the alternator is decreased to maintain the alternator voltage for the new load condition.

In Fig. 3, I have illustrated an embodiment of my invention in a regulating system which may be referred to as of the "engine governor" type in contradistinction to the "position" type shown in Fig. 1 and the "dynamic" type shown in Fig. 2. The "engine governor" type is based on the fundamental idea of providing a magnifying system by means of which any small variation from the proper value automatically causes a large corrective effect. Unlike the "dynamic" system the "governor" system of regulation has a position of stability which it assumes after every change in operating condition. But after each adjustment the position of stability at which the regulator comes to rest will be slightly different. It is typical of this form of regulator that no regulating action can occur until the voltage actually deviates from the proper value and that after making the necessary correction the voltage cannot be restored to exactly the correct value at which it was before but that the new value of voltage must differ slightly from the previous value.

The elements of the regulating system shown in Fig. 3 which are similar to the elements shown in Fig. 2 have been given like numerals for purposes of comparison. The voltage determining circuits including the rectifiers 48, 49, and 50, the direct current bridge 17, the alternating current bridge 18, and the controlled rectifier units 54 and 55 are connected in the same manner as in Fig. 2. Similarly, alternator field winding 37 of alternator 35, exciter 38 and exciter field winding 39 are energized from the power circuit 36 through the electric valves 40, 41 and 42 and the transformer 43.

The modification of this embodiment which differs from that in Fig. 2 is in the manner of controlling the electric valves 40, 41 and 42. Each of these valves is controlled from a phase shifting circuit in the form of an impedance bridge having a saturable reactor in one arm of the bridge. As shown valve 40 is controlled from a phase shifting circuit 67 comprising resistance arms 68, 69 and 70 and a saturable reactor 71. The saturable reactor 71 is provided with a saturating winding 72. Similarly, valve 41 is controlled from a phase shifting circuit 73 having resistance arms 74, 75 and 76 and a saturable reactor 77 provided with a saturating winding 78. In like manner valve 42 is controlled from a phase shifting circuit 79 having resistance arms 80, 81 and 82 and a saturable reactor 83 provided with a saturating winding 84. The saturating windings 72, 78 and 84 are connected in series in the output circuit of the controlled rectifiers 54 and 55. The phase shifting circuits are energized from the power circuit 36. Across the output terminals of the phase shifting circuits 67, 73 and 79 I connect transformers 85, 86 and 87, respectively, having the secondary windings thereof connected to energize the grid circuits of valves 40, 41 and 42, respectively.

The operation of the embodiment illustrated in Fig. 3 is as follows: It will be assumed that the alternator 35 and its exciter 38 are in operation. It will be readily understood that the operation up to the phase shifter circuit is the same as that described in connection with the arrangement shown in Fig. 2. That is, for any line voltage above the balance point of bridge 17 there is a corresponding direct current output from the controlled rectifiers 54 and 55 and for lower values of line voltage there is a zero or negligible output from the controlled rectifiers. The phase shifter output is applied to the grids of the valves 40, 41 and 42, the average direct current output of which is dependent upon the phase of the grid voltage with respect to the anode voltage. As the phase of the grid voltage is shifted from 180 degress to zero degrees lag with respect to the anode voltage the alternator field current varies from the base value of a maximum.

At a line voltage below the regulating limit the controlled rectifiers 54 and 55 have no effect on the phase shifting network. Under this condition the phase shifting network output voltage is nearly in phase with the anode voltage of the electric valves and the field current rises nearly to a maximum. As the line voltage increases due to the additional field current, a range is reached where the controlled rectifiers provide a direct current in the saturating windings 72, 78 and 84. Dependent upon the current in the saturating coils, the reactance of this one leg of the phase shifting circuit decreases and shifts the output voltage phase so that it lags the anode voltage in the respective valves. This change in grid voltage phase reduces the field current from the maximum value and lowers the line voltage to some steady point within the regulating range.

Now any increase in load will reduce the line voltage slightly, thereby decreasing the saturating current of the phase shifting networks so as to shift the grid potential more nearly in phase with the anode potential and increase the field current. In a similar manner an increase in line voltage tends to cause the grid potential to lag the anode potential of the valves and thereby decrease the field current.

In contrast to the dynamic regulating system shown in Fig. 2 this circuit is always in a steady state unless a change in load is taking place. Any change in load merely causes the regulator to assume another steady state condition which furnishes a line voltage either slightly above or below the original value.

While I have shown and described particular embodiments of my invention it will be obvious to those skilled in the art that various changes and modifications may be made without departing from my invention in its broader aspects and I, therefore, aim in the appended claims to cover all such changes and modifications as fall within the true spirit and scope of my invention.

What I claim as new and desire to secure by Letters Patent of the United States, is:

1. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances connected to be energized from said alternating current source, and means operative in accordance with the difference voltage of the direct current bridge circuit for varying one of said impedances for producing a similar amplified difference voltage in said alternating current bridge.

2. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances connected to be energized from said alternating current source, means for varying one of said impedances in accordance with a direct current difference voltage in one direction, and means for varying another of said impedances in accordance with a direct current difference voltage in the opposite direction.

3. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances including a reactor provided with a saturating winding, said saturating winding being connected to be energized in accordance with a difference voltage of said direct current bridge for producing a difference voltage in said alternating current bridge varying in magnitude and direction in accordance with the magnitude and direction of said direct current difference voltage.

4. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances including two reactors in adjacent arms and each provided with a saturating winding, and parallel circuits including oppositely connected rectifiers in the respective circuits for energizing said saturating windings in accordance with the direction of unbalance of said direct current bridge.

5. In combination, an electric discharge device provided with a control electrode, means for controlling the conductivity of said discharge device comprising, a direct current circuit, a bridge circuit comprising resistance elements having linear and non-linear volt-ampere characteristics respectively and connected to be energized from said direct current circuit, a second bridge circuit having input terminals and output terminals and comprising a plurality of impedances, a source of alternating current connected to energize said electric discharge device and said second bridge circuit, and means operative in accordance with the difference voltage of the direct current bridge circuit for varying one of said impedances for producing an amplified difference voltage at the output terminals of said alternating current bridge circuit, said output terminals being connected to control the potential of the control electrode of said discharge device.

6. In combination, a vapor electric valve provided with a control grid, means for controlling the starting of current through said valve comprising, a direct current circuit, a bridge circuit comprising resistance elements having linear and non-linear volt-ampere characteristics respectively and connected to be energized from said direct current circuit, a second bridge circuit having input and output terminals and comprising a plurality of impedances including a reactor provided with a saturating winding, a source of alternating current connected to energize said valve and said second bridge, said saturating winding being connected to be energized in accordance with the difference voltage of said bridge for producing a corresponding difference voltage varying in magnitude and phase in said second bridge, the control grid of said valve being connected to the output terminals of said second bridge.

7. In combination, a dynamo-electric machine, a bridge circuit comprising resistance elements having linear and non-linear volt-ampere characteristics respectively and connected to be energized by a direct current voltage varying in accordance with an electrical characteristic of said machine, an alternating current circuit, a second bridge circuit comprising impedance elements connected to be energized from said alternating current circuit, means operative in accordance with the difference voltage of said direct current bridge for producing a corresponding difference voltage in said alternating current bridge, and means operative in accordance with the difference voltage of said alternating current bridge for controlling an electrical characteristic of said dynamo-machine.

8. In combination, a direct current dynamo-electric machine having an excitation circuit, a pair of vapor electric valves for controlling the energization of said excitation circuit, a bridge circuit comprising resistance elements having linear and non-linear volt-ampere characteristics respectively and connected to be responsive to the voltage of said machine, said bridge circuit being balanced for the predetermined normal voltage of said machine, a second bridge circuit having input and output terminals comprising impedance elements including reactors having saturating windings in adjacent arms, an alternating current circuit connected to energize said valve and said second bridge, a circuit including a rectifier energized from said direct current bridge for energizing one of said saturating windings so as to produce a difference voltage in said second bridge for rendering one of said valves conducting when said direct current bridge unbalances in one direction, and a second circuit including an oppositely connected rectifier energized from said direct current bridge for energizing the other of said saturating windings when said direct current bridge unbalances in the opposite direction.

9. In combination, a polyphase alternating current dynamo-electric machine having an excitation circuit, vapor electric valves connected to be energized from said polyphase circuit for controlling the energization of said excitation circuit, a bridge circuit comprising resistance elements having linear and non-linear volt-ampere characteristics respectively, rectifying means connected to energize said bridge circuit with a direct current voltage which is a function of the polyphase voltage of said dynamo-electric machine, a second bridge circuit connected to be energized from said alternating current machine and comprising impedance elements including a reactor having a saturating winding, means for energizing said saturating winding in accordance with the difference voltage in one direction of said direct current bridge, and means operative in accordance with the difference voltage of said second bridge for controlling the ratio of the number of cycles said valves are conducting to the number of cycles said valves are non-conducting.

10. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances connected to be energized from said alternating current source, means operative in accordance with the difference voltage of the direct current bridge circuit for varying one of said impedances for producing a corresponding difference voltage in said second bridge, a phase shifting circuit connected to be energized from said alternating current circuit, and means operative in accordance with the difference voltage of said second bridge for varying the phase relation between the applied and output voltages of said phase shifting circuit.

11. In a regulating system, a source of direct current, a bridge circuit comprising resistance elements having linear and non-linear volt-ampere characteristics respectively and connected to be energized from said direct current source, a source of alternating current, a second bridge circuit comprising a plurality of impedances connected to be energized from said alternating current source and including a reactor having a saturating winding, said saturating winding being connected to be energized in accordance with the difference voltage of said direct current bridge circuit for producing an amplified difference voltage in said second bridge, a phase shifting circuit connected to be energized from said alternating current source and including a reactor having a saturating winding, said last mentioned saturating winding being connected to be energized in accordance with the difference voltage of said second bridge circuit for varying the phase relation between the applied and output voltages of said phase shifting circuit.

12. In combination, a dynamo-electric machine having a winding, an alternating current circuit, means for energizing said winding from said circuit including an electric valve provided with an anode and a control grid, an impedance phase shifting circuit for controlling the potential of said control grid, a bridge circuit comprising resistance elements having linear and non-linear volt-ampere characteristics respectively, means for energizing said bridge circuit by a direct current voltage varying in accordance with an operating condition of said machine, a second bridge circuit comprising impedance elements connected to be energized from said alternating current circuit, means operative in accordance with the difference voltage of said direct current bridge circuit for producing a difference voltage in said second bridge, and means operative in accordance with the difference voltage of said second bridge for controlling said phase shifting circuit to vary the phase relation between the anode and grid potentials of said valve.

13. In combination, a polyphase alternating current dynamo-electric machine having an excitation circuit, vapor electric valves each having an anode and a grid, and connected to be energized from said polyphase circuit for controlling the energization of said excitation circuit, a bridge circuit comprising resistance elements having linear and non-linear volt-ampere characteristics respectively, rectifying means connected to energize said bridge circuit with a direct current voltage which is a function of the polyphase voltages of said dynamo-electric machine, a second bridge circuit connected to be energized from said alternating current machine and comprising impedance elements including a reactor having a saturating winding, means for energizing said saturating winding in accordance with the difference voltage in one direction of said direct current bridge, an impedance phase shifting circuit including a reactor provided with a saturating winding for controlling said valves, said last mentioned saturating winding being energized in accordance with the difference voltage of said second bridge circuit for controlling the phase relation between the anode and grid potentials of said valves.

ALAN S. FITZ GERALD.